July 14, 1964 W. G. HARRISON ETAL 3,140,771
DELIVERY APPARATUS
Filed Sept. 19, 1961 2 Sheets-Sheet 2

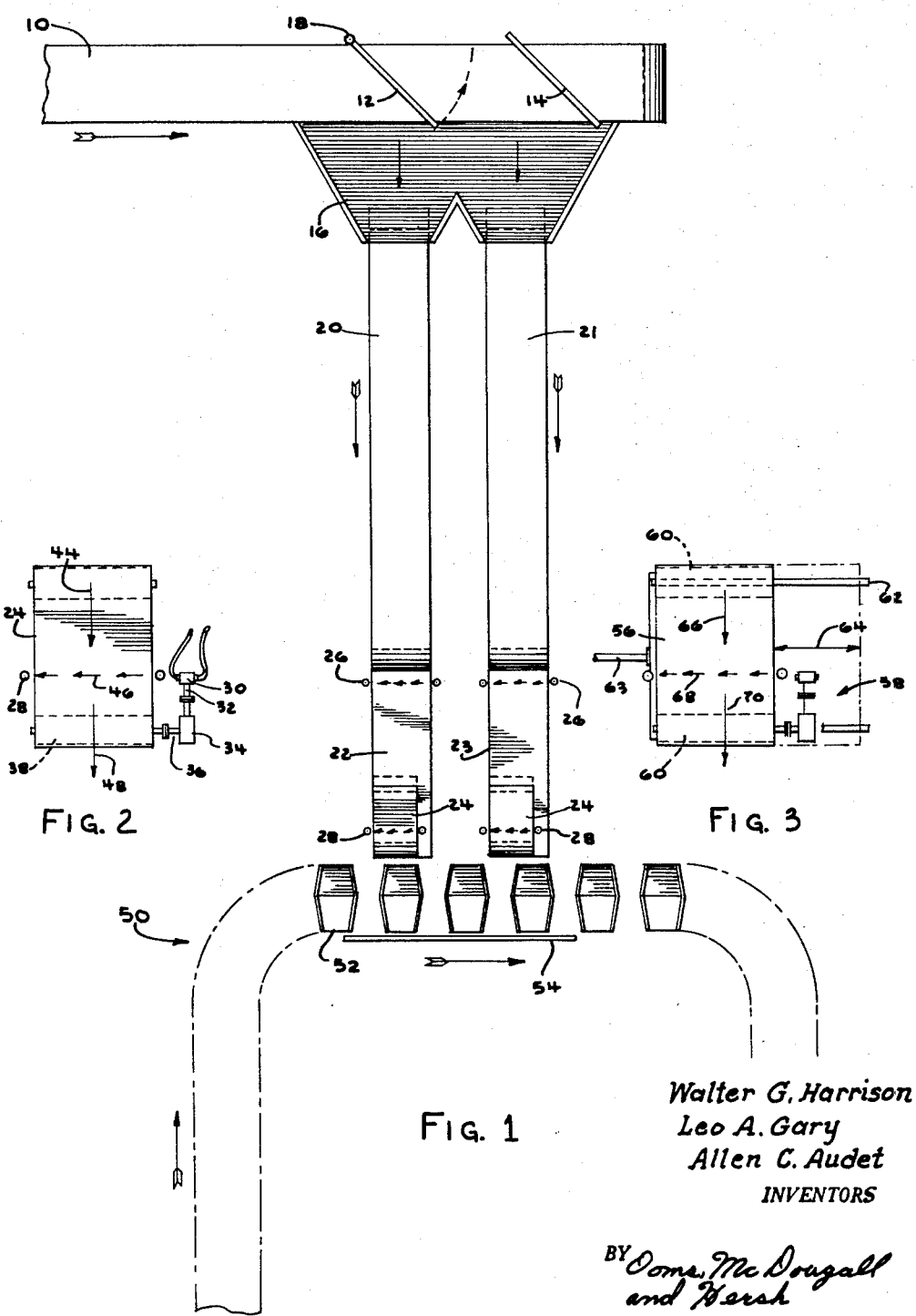

Walter G. Harrison
Leo A. Gary
Allen C. Audet
INVENTORS

BY Ooms, Mc Dougall
and Hersh
ATT'YS.

United States Patent Office 3,140,771
Patented July 14, 1964

3,140,771
DELIVERY APPARATUS
Walter G. Harrison, Westchester, Leo A. Gary, Chicago, and Allen C. Audet, Arlington Heights, Ill., assignors, by mesne assignments, to Prospect Manufacturing Co. Inc., Chicago, Ill., a corporation of Illinois
Filed Sept. 19, 1961, Ser. No. 139,140
15 Claims. (Cl. 198—20)

This invention relates to a delivery apparatus, and it relates more particularly to improved means for depositing of articles onto a conveyor for discharge by the conveyor at a plurality of preselected stations.

In copending application Serial No. 81,754, filed January 10, 1961, and entitled Automatic Sortation System, there is disclosed an apparatus which provides for passing of articles to a conveyor and subsequent delivery of these articles to any of a plurality of preselected stations. The prior disclosed apparatus provides for coding of the articles as they are passed to the conveyor and a memory system is provided whereby the articles can be deposited on either side of the conveyor in accordance with locations corresponding to the various codes.

It is, of course, desirable to provide means for effectively and efficiently delivering articles such as various packages and parcels onto conveyors of the type described in said copending application. Furthermore, it is necessary that means be provided whereby the various codes can be assigned to such articles in a rapid manner whereby the characteristics of conveyors of the type previously disclosed can be fully utilized.

In order that the prior disclosed conveyor system may be used at its full capacity, it is preferred that the means for delivering packages thereto be essentially automatic and capable of rapidly transferring the packages and their assigned codes simultaneously. The provision of a delivery system of this type will substantially reduce the time and labor necessary for feeding conveyors of the type previously described and will also greatly reduce errors in the delivery operation.

It is, therefore, an object of this invention to provide an improved means for depositing articles onto a conveyor for subsequent discharge by the conveyor at a plurality of preselected stations.

It is an additional object of this invention to provide a construction of the type described which is capable of simultaneously transferring the articles along with assigned codes to a conveyor which is capable of automatically discharging the articles at stations corresponding to said codes.

It is a further object of this invention to provide a delivery apparatus which is capable of operating in a highly efficient, rapid manner, the apparatus being essentially automatic whereby a substantial reduction in time, labor and possibility of error is achieved.

These and other objects of this invention will appear hereinafter and for purposes of illustration, but not of limitation, specific embodiments of this invention are shown in the accompanying drawings wherein—

FIGURE 1 is a schematic illustration of the delivery apparatus of this invention as it appears associated with a conveyor apparatus;

FIGURE 2 is a detail view of a representative delivery means and drive means therefor employed in the practice of this invention;

FIGURE 3 is a detail view of an alternative delivery means and associated drive means;

Figure 4:
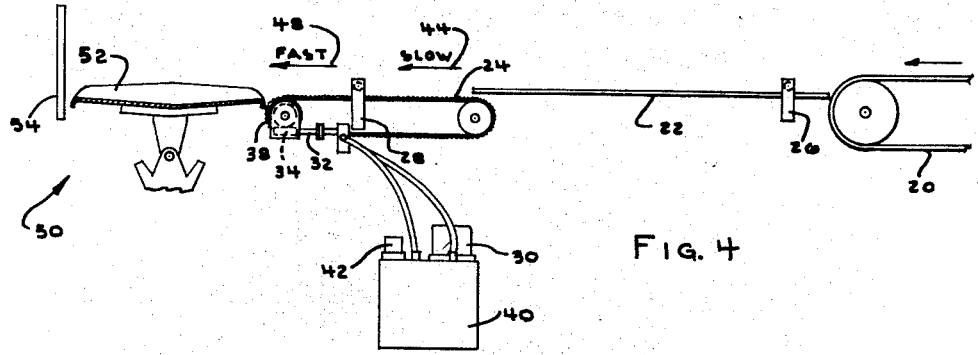
FIGURE 4 is a side elevation illustrating the delivery means of this invention associated with a conveyor.

The present invention generally relates to an apparatus for delivering articles to a conveyor which moves in a path adjacent the delivery end of the apparatus. The inventive apparatus includes an endless belt having a drive means which has a stop position, a low speed position and a high speed position. The drive means is adapted to move the belt with an article thereon until the article is positioned at a preselected point relative to the conveyor. The belt will then be stopped until a portion of the conveyor is in a position to receive the article contained on the belt. At this time, the drive means switches to a high speed position and the article is passed onto the conveyor. Where the conveyor is of the type set forth in the aforementioned copending application, a code which has been assigned to the article will be simultaneously passed to a memory device associated with the conveyor whereby the conveyor will discharge the article at a station corresponding to the assigned code.

In an alternative form of delivery apparatus means are provided for reciprocally moving, in a direction parallel to the conveyor path, the carriage upon which the delivery belt is mounted. This reciprocating means is controlled whereby it will become operative when the drive means for the belt is moved to high speed position. Therefore, an additional component is added to the path of the article passed from the delivery belt. This additional component adds to the versatility of the apparatus in that it enables more accurate positioning of the articles with respect to the conveyor as they are passed thereto and also permits operating of the conveyor at higher speeds.

Referring to the drawings, there is shown a main belt 10 which is provided for passing articles to a pair of deflectors 12 and 14 whereby the articles will be deflected onto a downwardly inclined slide 16. The deflector 12 is pivotally mounted at 18 whereby it can be moved out of the path of conveyor 10 when the belt 20 at the end of the slide is full. Articles on the belt 10 will then be deflected by the deflector 14 and passed to the belt 21.

Transfer belts 20 and 21 are of the endless belt variety and are adapted to deliver articles thereon to the tables 22 and 23 respectively. Each of these tables has associated therewith an electric eye, photocell or similar device for determining the presence of an article at the ends of the transfer belts. When the beam of the detecting means 26 is broken, the drive means for the belts 20 and 21 are stopped whereby articles will not pile up on the tables 22 and 23.

A pair of delivery belts 24 are associated with the tables 22 and 23 and a second set of detecting means 28 are positioned to detect the presence of articles on the belts 24. Drive means for the belts 24 preferably comprise hydraulic gear motor 30 having a drive shaft 32 which is connected to gear box 34. Shaft 36 is driven through the gear box 34 and is connected to cylinder 38 which is provided for driving of the endless belts 24.

The hydraulic gear motor 30 is driven in a well known manner by means of a hydraulic fluid tank and pump 40 (FIGURE 4). The operation of the motor is controlled by solenoid valve means 42 which is adapted to regulate the fluid flow to the motor to provide for high and low speed running of the belt 24. In addition, a stop position is provided whereby the fluid flow is shut off and the belt 24 will remain stationary.

Arrow 44, shown in FIGURE 2, represents the traverse of an article at slow speed after it is placed on the belt 24 by an operator. The article travels from the edge of a table to the position indicated by the arrows 46. The arrows 46 represent the path of an electric eye beam, and breaking of this beam by an article will result in stopping of the drive means for the belt 24.

Arrow 48, shown in FIGURE 2, represents the high speed traverse of an article from the line 46 onto conveyor 50 which passes adjacent the end of the belt. The conveyor 50 shown is intended to be of the type disclosed in the aforementioned copending application and comprises a plurality of trays 52 which are adapted to receive articles and to be tilted when it is desired to dump the articles at a preselected station. A backstop 54 is provided for preventing passing of the articles beyond the trays 52.

In the operation of the apparatus employing a delivery unit such as shown in FIGURE 2, articles are passed from conveyor belt 10 to endless belt 20 to the front end of the table 22. An operator at this point checks the destination of the article and codes the article by means of a control unit to be hereinafter described. The article is then placed on the belt 24 which is moving at its slow speed position, it being assumed that the belt 24 is empty at this time. The article will then be moved into the path of electric eye 28 at which time the control mechanism is adapted to stop the drive means for the belt 24. A tray 52 coming into position is adapted to mechanically actuate a switch which will energize the solenoid 42 associated with the belt drive means and the drive means will then be operated at high speed to pass the article to the conveyor. Simultaneously, the control means of the apparatus is adapted to transfer to a memory unit of the conveyor the code assigned to the article and, therefore, the tray 52 will dump the article at a station corresponding to the assigned code.

FIGURE 3 illustrates an embodiment wherein articles can be transferred to a conveyor moving at a faster speed or wherein articles of awkward sizes can be more accurately positioned with respect to the conveyor, thus avoiding errors or interruptions in the operation.

In this embodiment a delivery belt 56 is provided with a drive assembly 58 substantially the same as that described with respect to the belt 24. However, the cylinders 60 about which the belt 56 travels are mounted on a carriage which is in turn mounted on tracks 62. A reciprocal ram 63 is attached to the carriage and is adapted to reciprocate the carriage as indicated by the arrow 64. Arrows 66, 68 and 70 indicate the low speed, stop and high speed positions, respectively, of an article to be carried on the belt 56. The operation of this unit is substantially the same as that previously described, however, in this case, an angular path is imparted to the articles passed to the conveyor 50, since the ram 63 is adapted to move the belt carriage rapidly to the right at the same time as the drive means for belt 56 operates in the high speed position. It will be apparent that the component of movement of the articles which is parallel to the conveyor will enable more satisfactory positioning of the articles thereon.

It will be apparent that in the operation of the delivery apparatus of this invention the reciprocating mechanism, including the ram 63 as well as the drive means for the belts 24 and 56 and the drive means for the conveyor 50, must be synchronized in order to insure smooth operation of the apparatus. Automatic speed synchronization between the reciprocating ram 63 and the conveyor 50 can be maintained by means of a fluid pump which is coupled to an output shaft of a variable speed control for the conveyor drive. The fluid pump will feed the drive for the ram 63 and therefore variations in conveyor speed will result in corresponding variations in the reciprocating speed of the ram. It will be apparent that other synchronizing means, functioning in an equivalent manner, can also be utilized.

It will also be apparent that the position of mechanical switches which initiate a delivery to the conveyor must be maintained whereby the various speed synchronizations will be properly related thereto. No set rule can, of course, be established for the various speeds and timing. However, it will be apparent that once a desired speed of operation is settled upon, all these factors can be readily determined.

Figure 5:
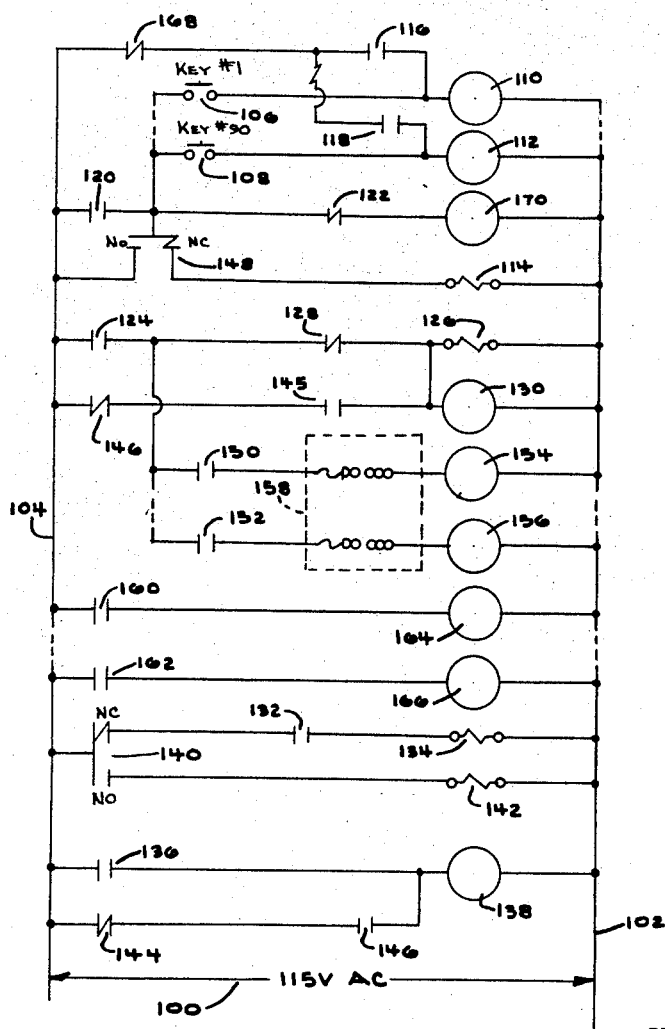
FIGURE 5 is an illustration of the circuitry employed in the operation of the delivery apparatus.

The circuit illustrated in FIGURE 5 will further aid in explaining the operation of the apparatus of this invention. This circuit comprises an A.C. source 100 connected by means of conductors 102 and 104 to the actuating relays, solenoids and switches of the transfer mechanism. The circuit includes pushbutton switches 106 and 108 which are representative of a series of eighteen switches corresponding to the numerals 1–9 and 10–90. This arrangement will provide ninety-nine numerical coding combinations since any one of the units digits (1–9) can be actuated alone or in combination with any one of the tens digits (10–90), or any one of the tens digits can be actuated alone. It will be obvious that there is no actual limit on the number of pushbutton switches possible, this proposed combination merely being cited as an ideal practical example.

When an operator has determined the particular code number for a given package or other article to be deposited on the trays 52, the corresponding switch will be pushed and a transfer sequence can be thus commenced. Assuming that code 91 is desired, pushbutton switches 106 and 108 will be actuated by the operator and a circuit will be completed through pushbutton relays 110 and 112. Each of these completes its own holding circuit by closing switches 116 and 118, respectively.

When low speed valve solenoid 114 is energized, the belt 24 or 56 associated therewith will be moving at low speed and the operator will deposit the article destined for station #91 thereon. The belt carries the article until it reaches the path of electric eye 28, and interruption of the light beam results in opening of photo switch 122 de-energizing relay 120 which opens switch 120, thus de-energizing solenoid 114 and stopping the belt. (Solenoid 114 is normally energized through switch 120, as will hereinafter appear.)

The article now waits on the belt 24 until a tray 52 moves into position, this movement resulting in the actuation of conveyor switch 124 by the tray. The switch 124 is preferably of the mechanically operated type which is associated with the tray path whereby it will be closed each time a tray is in position to receive an article. Other means for actuating such a switch may include the use of an electric eye which will cause operation of the transfer cycle only after sensing an empty tray in position to receive an article.

Closing of switch 124 results in energization of high speed valve solenoid 126 through normally closed switch 128, and the belt 24 therefore operates at high speed (e.g., about 300 r.p.m.) to pass the article onto the tray now in position.

Where it is desired to employ the dual movement of the belt as in the apparatus of FIGURE 3, the closing of switch 124 further causes energization of relay 130 which closes switch 132 and results in energization of the forward stroke solenoid 134. This solenoid is adapted to move a belt and carriage as in FIGURE 3 to the right, imparting additional directional movement to the article passed to the conveyor. When the carriage reaches the end of this movement to the right, switch 136 is mechanically closed thereby, thus energizing the relay 138 and reversing the contacts on switch 140. This reversal de-energizes solenoid 134 and energizes return stroke solenoid 142 which causes return of the carriage to its normal left hand position. The return of the carriage to its normal position results in mechanical opening of switch 144 thus breaking the holding circuit of relay 138 through switch 146 and returning switch 140 to the normally closed position.

Both solenoids 142 and 134 are now de-energized since the holding circuit through switch 145 for relay 130 has been broken by mechanical opening of switch 146 which is positioned to be actuated by the conveyor within the time interval between the forward stroke of solenoid 134 and the return stroke of solenoid 142. De-energization of relay 130 opens switch 132 preventing energization of solenoid 134 and also returns the contacts on switch 148 to the normally closed position.

During energization of relay 130 and while the belt moves at high speed, the switch 148 is momentarily closed in the normally open position whereby relay 170 will be energized after the article leaves the belt. (Switch 122 closing when the light beam is uninterrupted.) Relay 170 completes its own holding circuit through switch 120 and therefore when the contact 148 is again switched to the normally closed position, low speed valve solenoid 114 will be energized. Thus, the circuit provides for normal movement of the belt at low speed when there is no interruption of the photo switch 122 or no high speed transfer occurring.

In order to transfer the code for the article as it is passed onto the belt, relays 110 and 112 are operative when energized to close switches 150 and 152, respectively. Therefore, when switch 124 is closed by the conveyor tray as it comes into position, relays 154 and 156 are energized through translator 158. Switches 160 and 162, respectively, are closed through action of relays 154 and 156, and this energizes memory timer trip coils 164 and 166. As in the case of applicants' companion copending applications entitled "Article Transfer Apparatus" and "Article Delivery Means," the energization of the memory timer coils is equivalent to the actuation of pushbuttons on a coding console of the type described in application Serial No. 81,754, filed January 10, 1961. Thus, the tray 52, on which the article destined for station #91 is carried, will automatically deposit the article at this station.

De-energization of the relays 110 and 112 is accomplished by mechanical opening of switch 168 by the conveyor after the memory timer coils 164 and 166 have operated. As in the case of conveyor switches 124 and 146, opening of switch 168 is readily fitted into a timed sequence. The actuation of these mechanical switches by the conveyor preferably results due to the action of drive chain pins located in desired positions in relation to each tray.

The translator 158 is preferably incorporated into this system to enable the shifting of codes to different dump stations along the conveyor route. Furthermore, such devices permit assigning of more than one code to a particular station, thus increasing the versatility of the apparatus.

It will be apparent that various operative elements of the disclosed apparatus can be replaced by equivalent mechanical or electrical components. In addition, the belts 24 and 56 could be employed alone or in combination and, where a plurality of belts are utilized, they can be arranged to alternate in their delivery operations.

There are many possible applications of the apparatus of this invention, including use for the sorting of various packages or articles to be delivered to various destinations, as in a postal operation wherein packages are designated for various cities, zones, etc. Obviously, many other industrial and commercial uses can also be considered.

It will be understood that other modifications may be made in the above described apparatus which provide the characteristics of this invention without departing from the spirit thereof, particularly as defined in the following claims.

We claim:

1. Apparatus for delivering articles to a conveyor moving in a path adjacent the delivery end of said apparatus comprising an endless belt having a delivery end, drive means for said belt having a stop position, a low speed position and a high speed position adapted to drive said belt, said drive means moving said belt at a low speed when said articles to be delivered are placed on the other end of the belt, means for putting said drive means in stop position after said articles have moved a predetermined amount on said belt and means for putting said drive means in high speed position for causing said articles to be passed onto said conveyor.

2. An apparatus according to claim 1 including means connected to said drive means for sensing an empty portion on said conveyor, said sensing means being adapted to actuate said drive means to switch said drive means from stop position to high speed position whereby articles on said belt are passed onto the empty portion of said conveyor.

3. An apparatus according to claim 1 including means associated with said conveyor for actuating said drive means to switch said drive means from stop position to high speed position whereby said articles on said belt are passed onto the empty portion of said conveyor, and additional means associated with said conveyor for actuating said drive means to switch said drive means from high speed position to low speed position.

4. Apparatus for delivering articles to a conveyor moving in a path adjacent the delivery end of said apparatus, comprising an endless belt, drive means having a stop position, a low speed position and a high speed position adapted to drive said belt, detecting means connected to said drive means adapted to detect the presence of articles on said belt, said detecting means operating to stop said belt when an article is detected thereby, and control means adapted to switch said drive means from stop position to high speed position, said control means being responsive to the presence of an empty portion on said conveyor.

5. An apparatus according to claim 4 including stations adjacent said conveyor for receiving articles which have been delivered thereto and coding means for assigning codes to articles delivered to said conveyor simultaneously with said delivery whereby said articles will be delivered to a preselected one of said stations.

6. An apparatus according to claim 4 wherein said control means includes a first switch associated with said conveyor adapted to actuate said control means to switch said drive means from stop position to high speed position when said empty portion of the conveyor is in position to receive an article and second switch means associated with said conveyor adapted to switch said drive means to low speed position after said article has been passed onto the conveyor.

7. An apparatus according to claim 4 wherein a plurality of belts are provided adjacent said conveyor for alternately delivering said articles.

8. In a sortation system wherein articles are adapted to be discharged at a plurality of preselected stations, the improvement comprising a delivery means for transferring said articles to a conveyor moving in a path adjacent thereto, said conveyor having discharge means for discharging articles at said stations, said delivery means comprising a first endless belt and means for passing articles onto said first belt, a table at the end of said first belt upon which said articles may rest for determination of their proper station, a second endless belt adjacent said table, drive means for said second belt having a stop position, a low speed position and a high speed position adapted to drive said second belt, said drive means moving said second belt at a low speed when said articles to be delivered are placed on the other end of the belt, means for putting said drive means in stop position after said articles have moved a predetermined amount on said second belt and means for putting said drive means in high speed position for causing said articles to be passed onto said conveyor.

9. In a sortation system wherein articles are to be discharged at a plurality of preselected stations, the improvement comprising a delivery means for transferring said articles to a conveyor moving in a path adjacent thereto, said conveyor having a plurality of tiltable trays and means for tilting said trays at said preselected stations, said delivery means comprising a first endless belt and means for passing articles onto said first belt, a table at the end of said first belt upon which said articles may rest for determination of their proper station, a second endless belt adjacent said table, drive means for said second belt having a stop position, a low speed position and a high speed position adapted to drive said second belt, said drive means moving said second belt at a low speed when said articles to be delivered are placed on the other end of the belt, means for putting said drive means in stop position after said articles have moved a predetermined amount on said second belt and means for putting said drive means in high speed position for causing said articles to be passed onto said conveyor.

10. An apparatus according to claim 9 wherein a plurality of pairs of said first and second belts are provided adjacent said conveyor for alternately delivering said articles.

11. Apparatus for delivering articles to a conveyor moving in a path adjacent the delivery end of said apparatus comprising an endless belt mounted on a carriage, drive means for said belt having a stop position, a low speed position and a high speed position, said drive means being adapted to drive said belt in a path approximately perpendicular to the path of said conveyor, means for reciprocally moving said carriage in a path approximately parallel to the path of said conveyor, said drive means moving said belt slowly when said articles to be delivered are placed on one end, means for putting said drive means in stop position after said articles have moved a predetermined amount on said belt, and means for putting said drive means in high speed position and for simultaneously moving said carriage parallel to said conveyor for causing said articles to be discharged onto said conveyor in an angular path having one component approximately perpendicular to said conveyor path and another component approximately parallel to said conveyor path.

12. Apparatus for delivering articles to a conveyor moving in a path adjacent the delivery end of said apparatus comprising an endless belt mounted on a carriage, drive means having a stop position, a low speed position and a high speed position adapted to drive said belt in a path approximately perpendicular to the path of said conveyor, means for reciprocally moving said carriage in a path approximately parallel to the path of said conveyor, detecting means connected to said drive means adapted to detect the presence of articles on said belt, said detecting means acting to switch said drive means from low speed position to stop position when an article is detected, and control means adapted to switch said drive means from stop position to high speed position and to simultaneously cause said reciprocating means to move said carriage along the path of said conveyor when a desired point on said conveyor passes adjacent said delivery end.

13. An apparatus according to claim 12 including stations adjacent said conveyor for receiving articles which have been delivered thereto and coding means for assigning codes to articles delivered to said conveyor simultaneously with said delivery whereby said articles will be delivered to a preselected one of said stations.

14. Apparatus for delivering articles to a conveyor moving in a path adjacent the delivery end of said apparatus comprising an endless belt, drive means having a stop position and a high speed position adapted to drive said belt, detecting means connected to said drive means adapted to detect the presence of articles on said belt, said detecting means operating said drive means to stop said belt when an article is detected thereby, and control means adapted to switch said drive means from said stop position to said high speed position, said control means operating in response to the presence of an empty portion on said conveyor whereby high speed movement of said belt will cause transfer of an article from said belt to said empty portion.

15. Apparatus for delivering articles to a conveyor moving in a path adjacent the delivery end of said apparatus comprising an endless belt mounted on a carriage, drive means adapted to drive said belt and including a stop position and a high speed position, said drive means being adapted to drive said belt in a path approximately perpendicular to the path of said conveyor, means for reciprocally moving said carriage in a path approximately parallel to the path of said conveyor, means for putting said drive means in a stop position in response to the presence of articles on said belt, and control means for putting said drive means in high speed position and for simultaneously operating said reciprocally moving means, said control means operating in response to the presence of an empty portion on said conveyor whereby articles to be discharged onto said conveyor move in an angular path having one component approximately perpendicular to said conveyor path and the other component approximately parallel to said conveyor path.

References Cited in the file of this patent

UNITED STATES PATENTS

| | | |
|---|---|---|
| 1,977,307 | Hayssen | Oct. 16, 1934 |
| 2,542,200 | Kraeger | Feb. 20, 1951 |
| 2,923,420 | Dyer | Feb. 2, 1960 |
| 3,034,665 | Speaker | May 15, 1962 |